United States Patent [19]

Hawkes

[11] Patent Number: 5,276,976
[45] Date of Patent: Jan. 11, 1994

[54] INDICATOR TIP TURRET

[76] Inventor: Hollis D. Hawkes, 28 Rublee St., Arlington, Mass. 02174

[21] Appl. No.: 945,119

[22] Filed: Sep. 15, 1992

[51] Int. Cl.⁵ .................. G01B 3/22; G01B 5/00
[52] U.S. Cl. ............................ 33/792; 33/560; 33/557; 33/783; 33/832
[58] Field of Search ............... 33/792, 783, 784, 791, 33/793, 794, 832, 836, 559, 560, 556, 557, 544.5, 544.6

[56] References Cited

U.S. PATENT DOCUMENTS

| | | |
|---|---|---|
| 2,209,628 | 7/1940 | Munson . |
| 2,226,756 | 12/1940 | Emery . |
| 2,395,130 | 2/1946 | Litman . |
| 2,456,383 | 12/1948 | Collins ................................ 33/832 |
| 3,180,030 | 4/1965 | Witzke . |
| 4,142,295 | 3/1979 | Nishina et al. ...................... 33/559 |
| 4,523,382 | 6/1985 | Werner et al. . |
| 5,014,444 | 5/1991 | Breyer .................................. 33/559 |
| 5,121,551 | 6/1992 | Linder et al. ........................ 33/559 |

FOREIGN PATENT DOCUMENTS 1651077 5/1991 U.S.S.R. ............................. 33/832

Primary Examiner—William A. Cuchlinski, Jr.
Assistant Examiner—C. W. Fulton
Attorney, Agent, or Firm—Hamilton, Brook, Smith & Reynolds

[57] ABSTRACT

An interchangeable indicator tip device for a dial indicator gauge features a rotatable turret having a plurality of indicator tips. Each indicator tip is rotatable to position a selected indicator tip into a measurement position where the selected tip functions as the indicator tip for the dial indicator gauge.

6 Claims, 3 Drawing Sheets

INDICATOR TIP TURRET

BACKGROUND OF THE INVENTION

Dial indicator gauges are widely used in the machining industry for inspecting and measuring dimensions in a machined work product. Typically, an indicator tip is attached to the movable end of the stationary dial indicator gauge and is brought into contact with the machined surface of the work product to be inspected. The distance traveled by the indicator tip for it to contact the surface is indicated on the dial indicator gauge and is an indication of the measured dimension.

Indicator tips are available in a variety of configurations for measuring dimensions on different types of surfaces and workpieces. For instance, a straight tip can be used to measure the depth of a machined surface, whereas a tip having a ball bearing on the end for contacting the surface to be measured can be used to measure the eccentricity of a machined surface, e.g., the dimensions of a cam. Furthermore, an angled tip can be used, for instance, to measure a surface which is inaccessible to a straight indicator tip. Often, measurements need to be made on the same workpiece using more than one type of indicator tip. In this case, the tip must be changed between measurements, or multiple workpieces must be measured first with one type of tip, and then measured again with another type of tip.

SUMMARY OF THE INVENTION

The present invention provides a dial indicator gauge having instantly interchangeable indicator tips for quickly making measurements requiring different types of indicator tips. A rotatable indicator tip turret allows the required tip to be instantly selected and positioned for measurement without having to readjust the selected tip each time it is used. The turret also has the advantage of positioning the selected tip in direct line with the shaft of the dial indicator gauge while positioning the unselected tips so they do not interface with measurements being made with the selected tip.

In general, in one aspect, this invention features an indicator tip apparatus having a turret body for mounting onto the shaft of a dial indicator gauge, or similar measuring instrument in place of a single indicator tip. A turret is rotatably connected to the turret body so that it rotates relative to the turret body. The turret holds a plurality of indicator tips and is rotatable to position a selected indicator tip into a measurement position where the selected tip functions as the indicator tip for the dial indicator gauge.

In preferred embodiments of the indicator tip apparatus, the turret is lockable into each of the plurality of selectable indicator tip positions. In one embodiment a spring loaded ball bearing protrudes from the turret body to contact matching indentations in the turret to lock the turret into each position. In another embodiment, a spring loaded ball bearing protrudes from the turret to contact matching indentations in the turret body.

In other preferred embodiments, the indicator tips extend radially out and at an obtuse angle from the axis of rotation of the turret. The selected indicator tip is aligned with the shaft of the dial indicator gauge when the indicator tip is rotated into the measurement position. The turret body is angled relative to the shaft of the dial indicator gauge and the turret includes a beveled peripheral edge at each indicator tip location for seating the indicator tip at an angle relative to the turret body to align the tip with the shaft.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
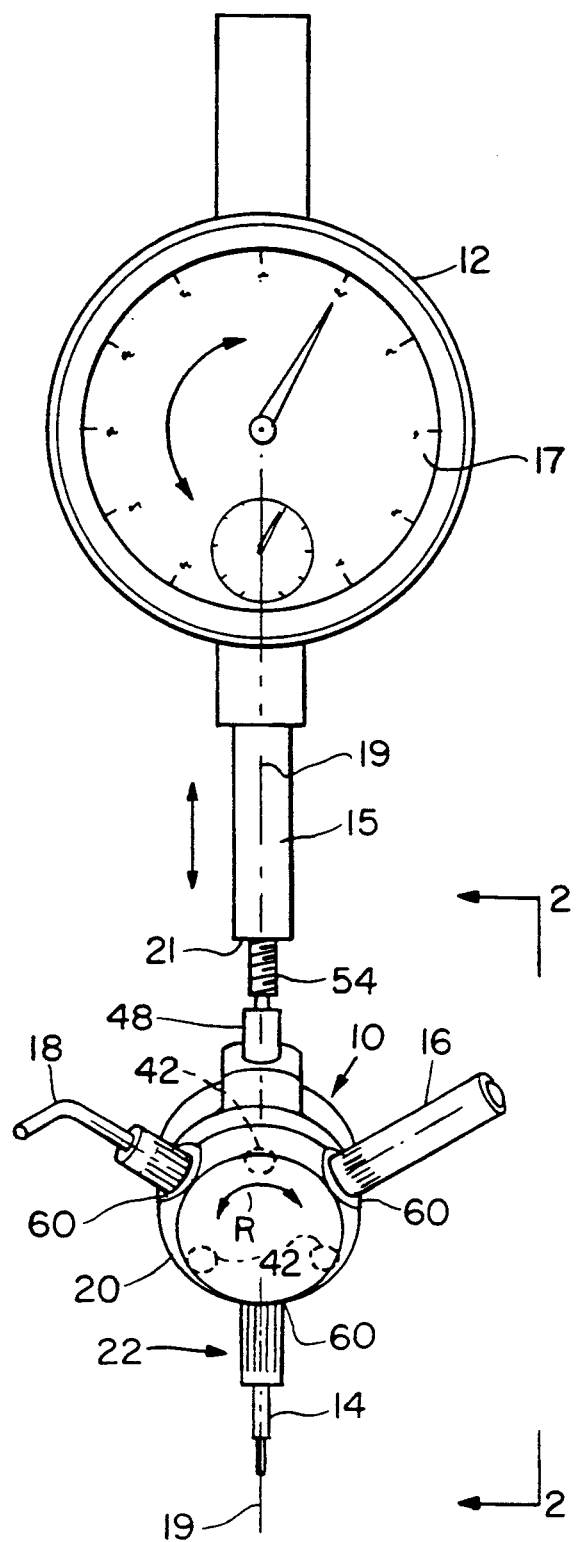
FIG. 1 is a front perspective view of the indicator tip turret assembly of this invention attached to a dial indicator gauge in place of a single indicator tip, and showing three different types of indicator tips mounted onto the rotatable turret.
Figure 2:
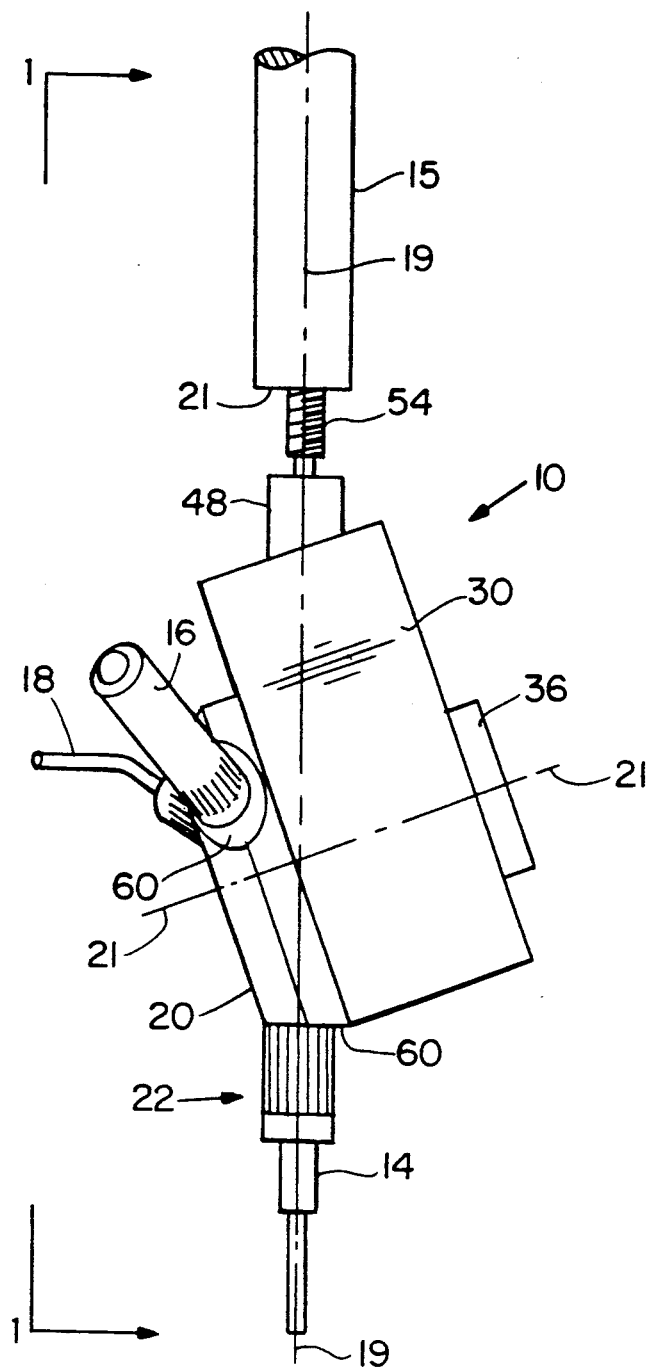
FIG. 2 is a side perspective view of the indicator tip turret assembly of FIG. 1 showing the alignment of the selected indicator tip with the dial indicator shaft and the placement of the unselected indicator tips relative to the selected tip.

Referring to FIGS. 1 and 2, an indicator tip turret assembly 10 for attachment to a dial indicator gauge 12 features a plurality of conventional indicator tips 14, 16, 18 threadably mounted onto a rotatable turret 20. The dial indicator gauge is typically fixed in place relative to a workpiece (not shown) and has a movable shaft 15 which moves linearly along a measurement axis 19 to measure displacement of the shaft. Displacement of the shaft is shown on a dial 17. One end 21 of the movable shaft 15 is adapted to receive a threadably mounted indicator tip which is brought into contact with the workpiece being measured. Indicator tip turret assembly 10 is threadably mounted onto the end 21 of the measurement shaft in place of a single indicator tip.

In operation, any of the indicator tips 14, 16 or 18 may be selected and rotated R into a measurement position 22 for making a dial indicator measurement on a workpiece with the selected tip. In the measurement position 22, the selected indicator tip is in alignment with the shaft 15 along measurement axis 19 of the dial indicator. A variety of indicator tip types can be attached to the turret 20 and each can be quickly rotated into the measurement position for making a particular type of measurement.

Figure 3:
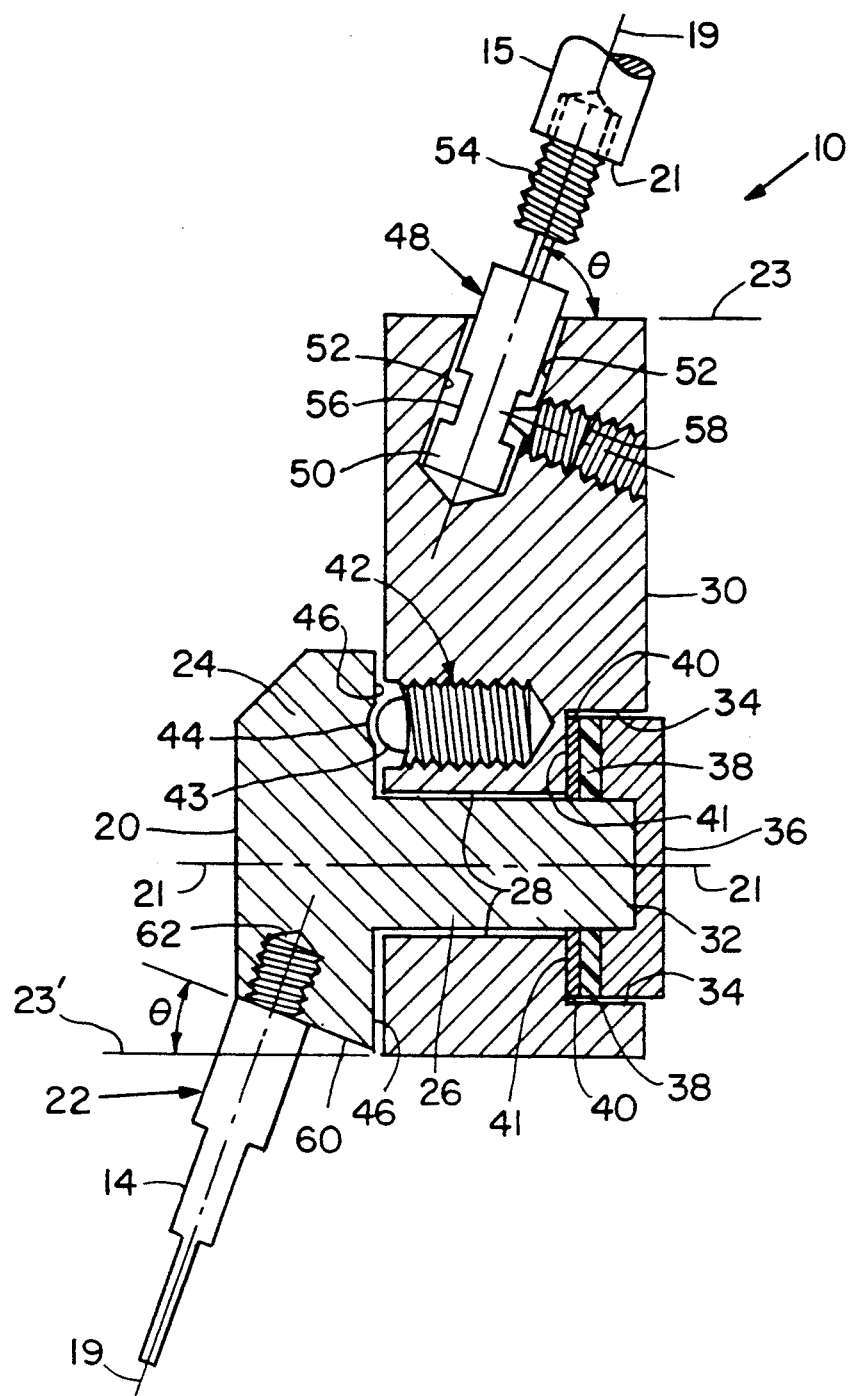
FIG. 3 is a cross-sectional side view of the indicator tip turret assembly of FIG. 1 showing the turret rotatably mounted in the turret body, the angular relationship between the selected indicator tip and the dial indicator shaft, the turret locking mechanism, and the turret assembly rotation and locking mechanism allowing rotation of the turret assembly relative to the dial indicator shaft.

FIG. 3 shows a cross-sectional view of a preferred embodiment of indicator tip turret assembly 10 of this invention. Rotatable turret 20 includes a face portion 24 for holding indicator tips 14, 16, 18, and a shaft portion 26 for rotatably connecting the turret to a turret body 30. Turret 20 rotates about an axis of rotation 21. The turret body 30 and the turret 20 can be machined from metal-stock, including aluminum, steel, and brass.

Turret shaft portion 26 is disposed in a mounting hole 28 of the turret body 30. The turret shaft portion 26 has an end 32 which protrudes beyond a countersink 34 of mounting hole 28. The turret is held in place by a cap 36 press fit onto the end 32 of the turret shaft portion 26. Cap 36 compresses a nylon washer 38 and a spring washer 40 between the cap 36 and the shoulder 41 formed by the countersink hole 34. The spring washer holds the turret snug against the turret body and the nylon prevents binding during rotation. Lubrication can be applied between the moving surfaces to further provide smooth operation.

The turret is temporarily locked into a selected position by a ball plunger 42 which is threadably mounted into a tapped hole in the body 30 such that the ball 43 contacts a detent 44 formed in the rear surface 46 of the turret face portion 24. A detent 44 is provided on the rear surface 46 to align with the ball plunger at each desired indicator tip lock position. The ball plunger acts in concert with each detent to lock the turret into various positions. Alternatively, ball plunger 42 can be threadably mounted into a tapped hole in the turret face portion 24 and detents provided in the turret body 30 to align with the ball plunger. Additional ball plungers can be provided so that each detent is mated with a ball plunger at each locked position. For instance, a plurality of plungers 42 (FIG. 1) can be uniformly distributed with respect to turret face 24 to contact a detent at each position. This provides smoother rotational operation than a single ball plunger.

Indicator tip turret assembly 10 is threadably attached to the end 20 of the dial indicator shaft 15 with an adapter 48 which is threaded onto the dial indicator shaft in place of a single conventional indicator tip. Adapter 48 has one end 50 mounted into a hole 52 in body 30, and another end having a portion 54 with standard indicator tip threads for attachment to the shaft of the dial indicator. End 50 of adapter 48 has a channel 56 which is contacted by a set screw 58 threaded through body 30 to lock the adapter 48 into place. The set screw can be loosened and the turret body rotated with respect to the adapter to set the position of the indicator tip turret assembly relative to the dial indicator face.

Adapter 48 and mounting hole 52 are angled relative to turret body 30 so that the measurement axis 19 of dial indicator shaft 15 forms an acute angle $\theta$ with a line 23 parallel to the turret axis of rotation 21. In one preferred embodiment angle $\theta$ is about 20°. Turret 20 has a indicator tip mounting surface 60 and threaded mounting hole 62 for mounting each indicator tip. Each mounting surface 60 is also beveled such that the selected indicator tip 14, 16, or 18 will be in alignment with the axis 19 of the dial indicator shaft 15 when the selected tip is rotated into the measurement position 22. That is, mounting surface 60 of the selected indicator tip also forms an angle $\theta$ with a line 23' which is parallel to the turret axis of rotation 21.

While this invention has been particularly shown and described with references to preferred embodiments thereof, it will be understood by those skilled in the art that various changes in form and details may be made therein without departing from the spirit and scope of the invention as defined by the appended claims. For example, although the preferred embodiment shows three indicator tips on the turret, a turret can be sized to hold a smaller or larger number of indicator tips. Further, the angle of the tips relative to the turret, and the turret body relative to the dial indicator shaft can be changed as necessary to provide alignment of the selected tip with the shaft and clearance between the unselected tips and the workpiece. Also, the indicator tip assembly of this invention can be used with other types of measurement and inspection instruments and is not limited for use only with a dial indicator gauge.

I claim:

1. An interchangeable indicator tip apparatus, comprising:
    a turret body adapted to be mounted onto the indicator tip end of a dial indicator gauge shaft, and
    a turret rotatably connected onto the turret body and rotatable relative to the turret body, the turret being adapted to hold a plurality of indicator tips, wherein the turret is rotatable to position a selected one of the plurality of indicator tips into a measurement position to function as the indicator tip for the dial indicator gauge.

2. The indicator tip apparatus of claim 1 wherein the turret is lockable into each of the plurality of selectable indicator tip positions.

3. The indicator tip apparatus of claim 2 wherein the turret body includes a spring loaded ball bearing protruding from the turret body and contacting one of a plurality of matching indentations in the turret to lock the turret into one of a plurality of positions relative to the turret body.

4. The indicator tip apparatus of claim 2 wherein the turret includes a spring loaded ball bearing protruding from the turret and contacting one of a plurality of matching indentations in the turret body to lock the turret into one of a plurality of positions relative to the turret body.

5. The indicator tip apparatus of claim 1 wherein
    the turret is adapted so that the plurality of indicator tips extend radially outward from the axis of rotation of the turret and at an obtuse angle relative to the axis of rotation of the turret; and
    the turret body is adapted so that a selected indicator tip is in alignment with shaft of the dial indicator when the indicator tip is rotated into the measurement position.

6. The indicator tip apparatus of claim 5 wherein
    the turret comprises a peripheral edge having a beveled portion at each location for seating an indicator tip, the beveled surface portion having a threaded aperture extending into the turret perpendicular to the beveled surface portion for threadably attaching an indicator tip to the turret.

* * * * *